E. W. BRYCE.
METHOD OF MANUFACTURING GLASS LAMPS.
APPLICATION FILED DEC. 19, 1910.
1,009,022.
Patented Nov. 14, 1911.
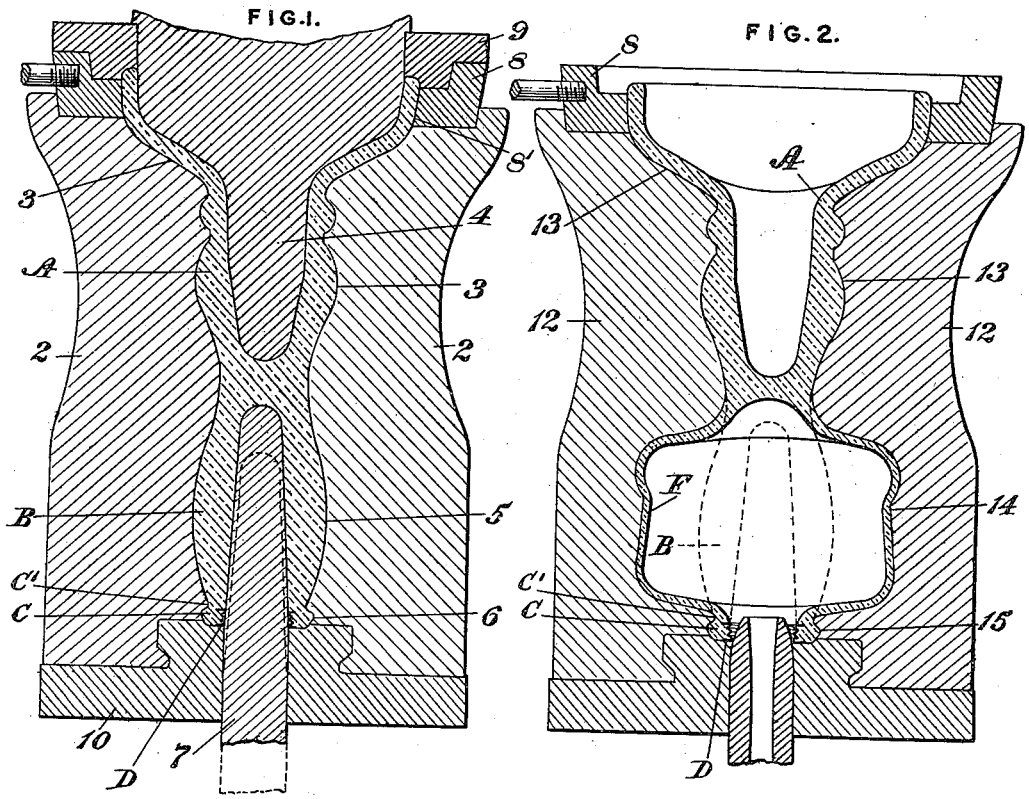
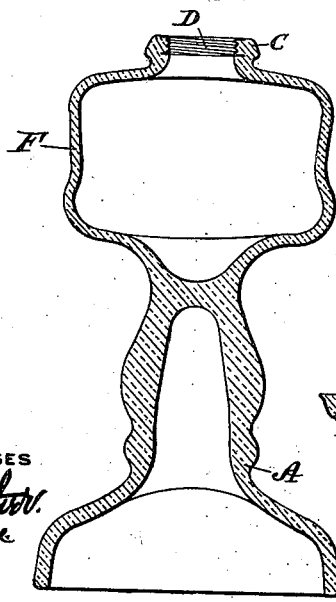
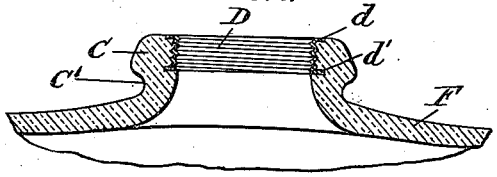
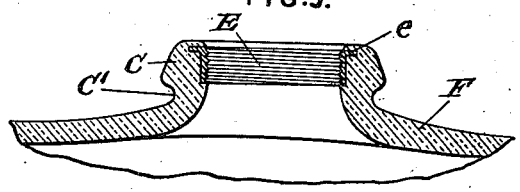
WITNESSES
INVENTOR
E. W. Bryce

UNITED STATES PATENT OFFICE.

EDWIN W. BRYCE, OF PITTSBURGH, PENNSYLVANIA.

METHOD OF MANUFACTURING GLASS LAMPS.

1,009,022.  Specification of Letters Patent.  Patented Nov. 14, 1911.

Application filed December 19, 1910. Serial No. 598,121.

*To all whom it may concern:*

Be it known that I, EDWIN W. BRYCE, a resident of Pittsburgh, in the county of Allegheny and State of Pennsylvania, have invented certain new and useful Improvements in Methods of Manufacturing Glass Lamps, of which the following is a specification.

This invention relates to glass oil-burning lamps, and has particular reference to a new method of forming such lamps with the burner-holding bushings permanently fixed therein during the forming operation.

In the accompanying drawings, Figure 1 illustrates the pressing stage of the lamp-forming operation, being a vertical section of the pressing glass-shaping mechanism, and Fig. 2 is a similar view illustrating the blowing stage. Fig. 3 is a sectional view of the completed lamp. Fig. 4 is an enlarged view of the neck portion of the lamp, and Fig. 5 is a like view showing a slightly different form of bushing.

In practicing the method by the means here illustrated, a press mold 2 is employed which is of the usual two-part form and adapted to open and close in the well known manner. The cavity 3 in the upper portion of the mold is shaped to give the desired external contour to a lamp base or pedestal A, which portion of the lamp receives its final shape in cavity 3.

4 is the pressing plunger which is actuated, and upon which requisite pressure is exerted, by any suitable means, the plunger determining the internal contour of base A.

The arrangement is preferably such that the lamp base is uppermost during the forming operations. Communicating with the base-forming mold cavity 3 is cavity 5 for the bowl blank B. The lower portion 6 of blank cavity 5 is of such contour as to give final shape to the neck-like extremity C of the blank which forms the neck of the completed lamp, cavity 6 being shaped to form the neck with an external irregularity, such as groove C'.

7 is a plug-like valve member which is inserted upwardly through bottom portion 6 of the blank-forming cavity and during the pressing operation extends upwardly thereinto, as in Fig. 1, the valve being raised and lowered by any means well known in the art.

The top of the mold 2 may be recessed to receive ring-like shell 8, while superimposed on the latter during the pressing operation is the usual mold ring 9. The inner surface 8' of shell 8 is so grooved or dished as to properly shape a portion of the exterior of base A immediately adjacent its extremity, and this contour of the shell gives it sufficient hold on the blank for lifting it from the press mold to the blow mold during the process of manufacture, as will presently appear.

Preceding the placing of molten glass in the press mold, a metallic burner-holding bushing D is placed on valve 7 and as such valve is usually tapered, the taper may be so gaged as to completely fill the bushing with the latter bearing on the mold base 10. Or the taper may be such as to hold a bushing E slightly above the extremity of cavity 6, so that glass may form around the outer surface and both edges of the bushing, as in Fig. 5.

As shown in Figs. 1, 2, 3 and 4, the bushing is formed with lateral flanges d, d', while in the form shown in Fig. 5 it may have but a single flange e. The bushing is preferably made of sheet brass with the internal burner-holding threads forming corresponding external irregularities, as in Figs. 1, 2, 3 and 4, while in Fig. 5 another form is illustrated in which the metal of the bushing is of such gage that the thread indentations do not appear in the outer surface.

With the bushing in position in portion 6 of the blank cavity, sufficient glass is placed in mold 2 to form the integral structure consisting of base A, bowl blank B, and neck C. The pressure exerted by plunger 4 in shaping base A is essential, in a one-piece base or pedestal lamp, for forming blank B and neck C. In fact, the high pressure obtained through or by means of plunger 4, or equivalent high pressing pressure however obtained, is necessary in order to properly form blank B and the finished neck C.

One result is that the viscous glass is forced around and into embracing engagement with the bushing D (or E), and into its external irregularities under such pressing pressure as to permanently and immovably grip and hold the bushing, this regardless of any slight difference in expansion or contraction between the glass and the metal of the bushing. And while the bushing is being thus immovably embedded in the glass the bushing interior is supported at all points by valve 7, so that it cannot yield or bulge inwardly.

It will be understood from the foregoing that the externally grooved neck C is completely formed during the blank pressing operation, so that said operation results in giving permanent shape to the lamp base and to the neck, at the same time forming the intervening bowl blank B.

Following the pressing operation, tapered valve 7 is lowered slightly as in dotted lines in Fig. 1, sufficiently to release its hold on the interior of blank B, and after plunger 4 and ring 9 have been removed, mold 2 is opened, and the pressed article supported by shell 8, as above described, is removed to the two-part blow mold 12 which is closed thereareound in the usual manner. The top of this mold is adapted to receive shell 8, and it is formed with a cavity 13 in which fits the pressed lamp base A, and beneath the latter is cavity 14 which corresponds to the contour of the lamp bowl, while at the bottom of cavity 14 is cavity 15 which fits exactly around the pressed neck C and into its external groove C'. The wall of cavity 15 so grips the pressed neck as a result of groove C' that it is quite impossible for the neck to stretch or become deformed under the expanding operation due to the blowing. With the parts thus located in the blow mold, and with the article so gripped at its neck that the latter cannot draw inward, and with the pressed base A accurately held by cavity 13, air under suitable pressure is introduced through a pipe or nozzle 16 inserted at neck C, as in Fig. 2, whereupon the glass of blank B is expanded to form the reservoir F, thus completing the contour of the lamp.

As a result of the pressing and blowing operations a one-piece lamp is produced having immovably embedded therein the burner-holding bushing. After being annealed the lamp is ready for use. While the annealing heat, and the initial heat of the glass, destroys the burnish of the brass bushing (when brass is used as is usual), this is no detriment as it is not exposed on the lamp exterior as is the case with the usual cemented collar. The method herein dispenses with the labor and expense incident to cementing the collar, and the lamp is safer and more durable as the burner-holding element can never loosen nor leak.

I claim:—

1. A method of manufacturing glass lamps consisting in supporting a burner-holding bushing in a press mold, pressing a lamp bowl blank in said mold with the glass forced into permanently tight engagement with the bushing by the blank-forming pressure, removing the blank from the press mold, and expanding the blank by blowing.

2. A method of manufacturing glass lamps consisting in supporting a burner-holding bushing in one end of a press mold, pressing a lamp bowl blank in said mold by pressure exerted on the glass in direction toward the bushing with the glass forming tightly and permanently around the bushing, removing the blank with its permanently fixed bushing from the press mold, and expanding the blank by blowing.

3. A method of manufacturing glass lamps consisting in supporting a burner-holding bushing in the neck forming portion of a press mold with the bushing spaced from the surrounding wall of such mold portion, pressing a bowl blank in such mold and by the same pressing operation forcing the glass into the neck forming portion of the mold around and into permanently tight engagement with the bushing, removing the blank from the press mold, and expanding the blank by blowing.

4. A method of manufacturing glass lamps, consisting in supporting a burner holding bushing in the neck forming portion of a press mold with said mold-portion shaped to form an externally indented lamp neck and the remainder of the mold shaped to form a lamp bowl blank, pressing by one operation the said blank and the lamp neck and by such pressing forcing the neck around and into permanently tight engagement with the bushing, placing the pressed blank in a blow mold and holding it therein by gripping the indented neck, and expanding the blank by blowing while thus held to form the lamp bowl.

5. A method of manufacturing glass lamps, consisting in supporting a burner holding bushing in a portion of a press mold shaped to form a lamp neck with said mold portion communicating with other portions of the mold which are shaped to form a bowl blank and a lamp base, subjecting glass to pressing pressure within the mold and in the direction of the neck-forming portion thereof and by such pressing forcing the glass of the neck around and into permanently tight engagement with the bushing and by the same pressing forming the integral bowl blank and lamp base, removing the blank from the blow mold, and expanding the blank by blowing to form the lamp bowl.

6. A method of manufacturing glass lamps consisting in internally supporting a sheet metal burner-holding bushing in the neck-forming portion of a lamp mold, pressing a glass lamp blank in said mold and by such pressing forming the blank with a neck of finished form which is tightly and permanently pressed around the bushing by the blank-forming pressure, and blowing the blank.

In testimony whereof I affix my signature in presence of two witnesses.

EDWIN W. BRYCE.

Witnesses:
 JOHN VERNER,
 THOS. D. PEEL.